US012412983B2

(12) United States Patent
Hanninen et al.

(10) Patent No.: US 12,412,983 B2
(45) Date of Patent: Sep. 9, 2025

(54) DUAL BAND LOOP AND INVERTED-F GROUND EDGE RADIATING ANTENNA STRUCTURE

(71) Applicant: Silicon Laboratories Inc., Austin, TX (US)

(72) Inventors: Tuomas Hanninen, Helsinki (FI); Attila Zolomy, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 218 days.

(21) Appl. No.: 18/215,288

(22) Filed: Jun. 28, 2023

(65) Prior Publication Data

US 2025/0007167 A1 Jan. 2, 2025

(51) Int. Cl.
*H01Q 9/04* (2006.01)
*H01Q 5/49* (2015.01)
*H01Q 9/30* (2006.01)

(52) U.S. Cl.
CPC ............. *H01Q 9/0414* (2013.01); *H01Q 5/49* (2015.01); *H01Q 9/30* (2013.01)

(58) Field of Classification Search
CPC ............ H01Q 1/48; H01Q 5/364; H01Q 5/49; H01Q 9/0414; H01Q 9/30; H01Q 9/42
See application file for complete search history.

(56) References Cited

U.S. PATENT DOCUMENTS 8,648,763 B2 * 2/2014 Choi ........................ H01Q 1/48 343/846
2022/0131271 A1 4/2022 Hanninen et al.
2022/0376395 A1 * 11/2022 Rahikkala ................ H01Q 1/38

FOREIGN PATENT DOCUMENTS

CN 211789520 U * 10/2020 ............... H01Q 1/38
CN 113193360 A * 7/2021 ............... H01Q 1/52

OTHER PUBLICATIONS

Silicon Laboratories Inc., AN1088: Designing with an Inverted-F 2.4 GHz PCB Antenna. 15 pages, Aug. 2017.

* cited by examiner

*Primary Examiner* — Hoang V Nguyen
(74) *Attorney, Agent, or Firm* — Nields, Lemack & Frame, LLC

(57) ABSTRACT

A dual band antenna structure is disclosed. The dual band antenna structure utilizes features from loop ground edge radiating antennas and inverted-F antennas to create an antenna that has two resonance frequencies. The dual band antenna structure includes a loop ground edge radiating antenna, which has a first resonance frequency. A monopole branch is also located at the end of the feeding trace to provide a second resonance frequency. The dual band antenna structure is useful for network devices that operate at multiple frequencies, such as those using the WiFi/BLE/IEEE802.15.4 protocols.

16 Claims, 10 Drawing Sheets

DUAL BAND LOOP AND INVERTED-F GROUND EDGE RADIATING ANTENNA STRUCTURE

This disclosure describes an antenna system, and more particularly an antenna having two different bands.

BACKGROUND

The explosion of network connected devices has led to an increased use of certain wireless protocols. Further, many of these network connected devices are configured to operate on multiple networks, or at multiple frequencies.

Various types of antenna structures are used in these devices. FIG. 1 shows a conventional loop ground edge radiating antenna. Typically, much of the top layer of the printed circuit board comprises a ground plane 15. The ground clearance 16 is a region of the top layer, which is not electrically conductive. In certain embodiments, the metal that typically resides in this region is removed. The ground clearance 16 may be rectangular in shape. The dimensions of the ground clearance 16 may be selected based on the desired performance of the antenna. For example, the width of the ground clearance 16 may affect the resonant frequency while the other dimension affects the bandwidth of the antenna.

An antenna radiator loop is created around the outside of the ground clearance 16. This antenna radiator loop allows the spread of loop-type current distributions on the ground plane 15 to be radiated outward.

An RF feed 10 is used as the source of the RF signal. The RF feed 10 is in communication with the feeding trace 12. The feeding trace 12 may include a right angle that attaches to the loop trace 14. The feeding trace 12 and the loop trace 14, like the rest of the ground plane 15, are a conductive material, such as copper.

The ground clearance 16 may be formed near the edge of the ground plane 15, such that the distance between the edge of the ground plane 15 and the ground clearance 16 proximate that edge is about 0.5 mm. Thus, a conductive pathway exists between the ground clearance 16 and the edge of the ground plane 15.

One or more capacitors 13 are disposed in series along the loop trace 14, such that current passing along the loop trace 14 must pass through the one or more capacitors 13. The one or more capacitors 13 may have the same value or different values.

Additionally, an input capacitor 11 is disposed between the feeding trace 12 and the RF feed 10. The RF feed 10 may connect to an impedance matching circuit, which, in turn, is in communication with the power amplifier of the radio circuitry.

In operation, the current path around the ground clearance 16 forms the antenna radiator loop. In other words, the strong current loop allows the spread of loop-type current distributions on the ground plane 15 to radiate outward. In this configuration, the value of the one or more capacitors 13 and the dimensions of the ground plane controls both the input impedance and the resonant frequency of the antenna.

FIG. 2 shows a different type of antenna structure, referred to as an inverted-F antenna. Like the loop antenna, the inverted-F antenna (IFA) includes a ground plane 26 and a ground clearance 28. Similarly, the inverted-F antenna includes a RF feed 20, which is in communication with a feeding trace 22. Additionally, an input capacitor 21 is disposed between the feeding trace 22 and the RF feed 20. As described above, the RF feed 20 may connect to an impedance matching circuit, which, in turn, is in communication with the power amplifier of the radio circuitry.

The feeding trace 22 terminates in a T connection. There is a connected branch 24 and a stub branch 23. The stub branch 23 terminates in the ground clearance 28. The connected branch 24 includes a right angle that attaches to the shunt branch 25. The shunt branch 25 is in contact with the ground plane 26. The feeding trace 22, the stub branch 23, the connected branch 24 and the shunt branch 25, like the rest of the ground plane 26, are a conductive material, such as copper.

Note that, unlike the loop antenna, the ground plane 26 does not extend to the edge 27 of the printed circuit board. Rather, there is a distance, which is greater than the length of the shunt branch 25, that separates the ground plane 26 from the edge 27 of the printed circuit board.

Various parameters dictate the frequency and bandwidth of the inverted-F antenna. These include the total length of the feeding trace 22 and the stub branch 23, which should be slightly shorter than one quarter wavelength of the frequency of interest. Other important parameters include the length of the shunt branch 25, the length of the connected branch 24 and the loop area they create together with the ground plane 26. The sum of the wire inductance of the connected branch 24, the wire inductance of the shunt branch 25 and the loop inductance of the loop are connected in parallel to the feeding trace 22 and tunes the IFA antenna impedance at the RF feed 20 to the required value, which may be, for example, 50 ohms. In typical IFA designs, the main function of the shunt branch 25, the connected branch 24 and the loop is impedance tuning.

However, each of these antenna structures is only suitable for one resonant frequency. There are certain network protocols, such as WiFi, that have multiple operating frequencies, which may be separated by several GHz. Therefore, it would be beneficial if there was a single antenna structure that could operate effectively in two different frequency bands.

SUMMARY

A dual band antenna structure is disclosed. The dual band antenna structure utilizes features from loop ground edge radiating antennas and inverted-F antennas to create an antenna that has two resonance frequencies. The dual band antenna structure includes a loop ground edge radiating antenna, which has a first resonance frequency. A monopole branch is also located at the end of the feeding trace to provide a second resonance frequency. The dual band antenna structure is useful for network devices that operate at multiple frequencies, such as those using the WiFi/BLE/IEEE802.15.4 protocols.

According to one embodiment, a dual band antenna is disclosed. The dual band antenna comprises a printed circuit board having a ground plane on a top layer, wherein the ground plane comprises a conductive material; a ground clearance disposed on the top layer, wherein the ground clearance lacks a conductive material; a loop ground edge radiating antenna having a feeding trace disposed in the ground clearance, and a loop branch, perpendicular to the feeding trace, that connects an end of the feeding trace to the ground plane; and a monopole branch extending from the end of the feeding trace in an opposite direction from the loop branch, wherein the monopole branch terminates in the ground clearance. In some embodiments, the loop ground edge radiating antenna has a resonance frequency between 2.4 GHZ and 2.5 GHZ. In some embodiments, a bandwidth of the loop ground edge radiating antenna is at least 200 MHz. In some embodiments, the feeding trace, the monopole branch and the loop branch form a monopole antenna, and the monopole antenna has a resonance frequency between 5.0 GHZ and 6.0 GHz. In some embodiments, a bandwidth of the monopole antenna is at least 700 MHz. In some embodiments, the ground clearance has dimensions that are equal to or less than 7 mm by 10 mm. In some embodiments, one or more capacitors are located along a path of the loop branch, such that current passing along the loop branch passes through the one or more capacitors. In some embodiments, the feeding trace, the monopole branch and the loop branch form a monopole antenna, and the monopole antenna includes a tuning branch disposed at the end of the monopole branch. In certain embodiments, the tuning branch is perpendicular to the monopole branch. In certain embodiments, the ground clearance is rectangular in shape and one side of the rectangularly shaped ground clearance is an edge of the printed circuit board and the ground plane extends to the edge of the printed circuit board on both sides of the ground clearance.

According to another embodiment, a dual band antenna is disclosed. The dual band antenna comprises a printed circuit board having a ground plane on a top layer, wherein the ground plane comprises a conductive material; a ground clearance disposed on the top layer, wherein the ground clearance is rectangular shaped and lacks a conductive material, wherein one side of the ground clearance is an edge of the printed circuit board and the ground plane extends to the edge of the printed circuit board on both sides of the ground clearance; a feeding trace disposed in the ground clearance, a proximal end of the feeding trace in communication with an input capacitor and a RF feed; a T connection disposed at a distal end of the feeding trace, wherein a loop branch extends perpendicular to the feeding trace in one direction and a monopole branch extends perpendicular to the feeding trace in an opposite direction; and wherein a distal end of the loop branch connects to the ground plane and a distal end of the monopole branch terminates in the ground clearance. In some embodiments, the T connection is located less than 2 mm from the edge of the printed circuit board. In some embodiments, the T connection is located less than 0.5 mm from the edge of the printed circuit board. In some embodiments, the monopole branch and the loop branch are each parallel to the edge of the printed circuit board. In some embodiments, the monopole branch includes a tuning trace, which is perpendicular to the monopole branch and parallel to the feeding trace. In some embodiments, one or more capacitors are disposed in series along the loop branch, such that current passing along the loop branch passes through the one or more capacitors. In some embodiments, the ground clearance has dimensions that are equal to or less than 7 mm by 10 mm.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
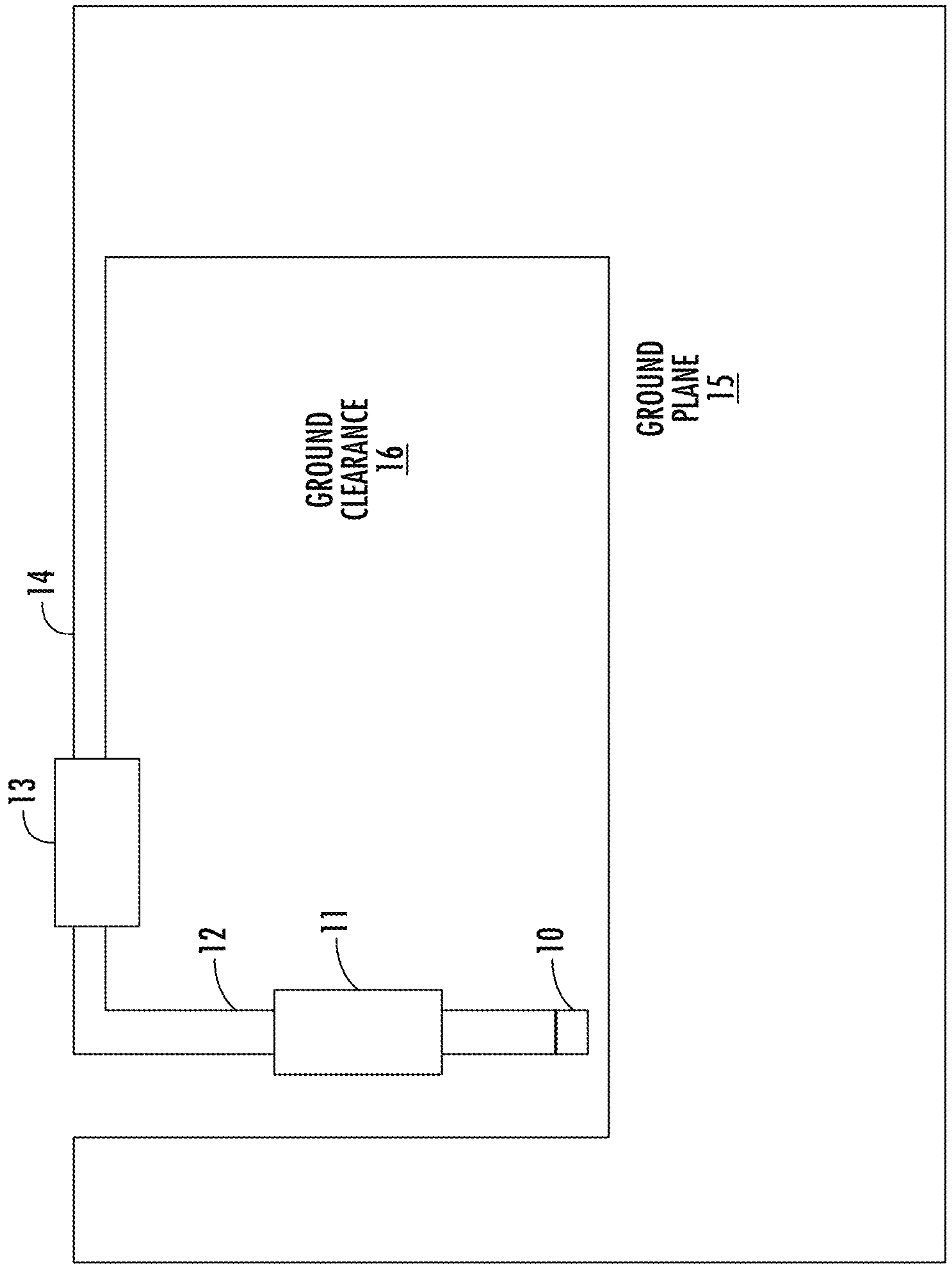
FIG. 1 PRIOR ART
FIG. 1 shows the topology of a loop ground edge radiating antenna according to the prior art.
Figure 2:
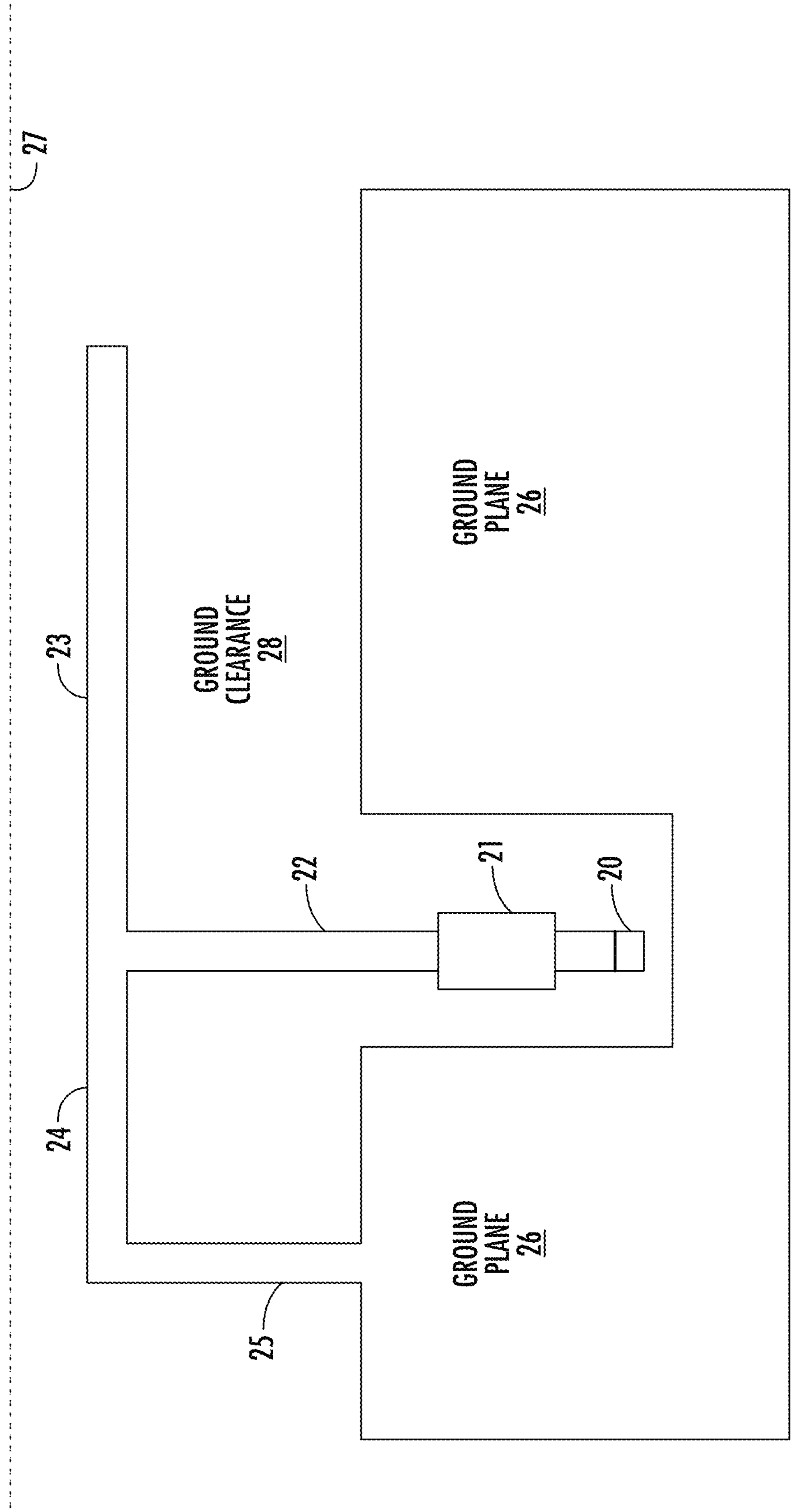
FIG. 2 PRIOR ART
FIG. 2 shows the topology of an inverted-F antenna according to the prior art.
Figure 3:
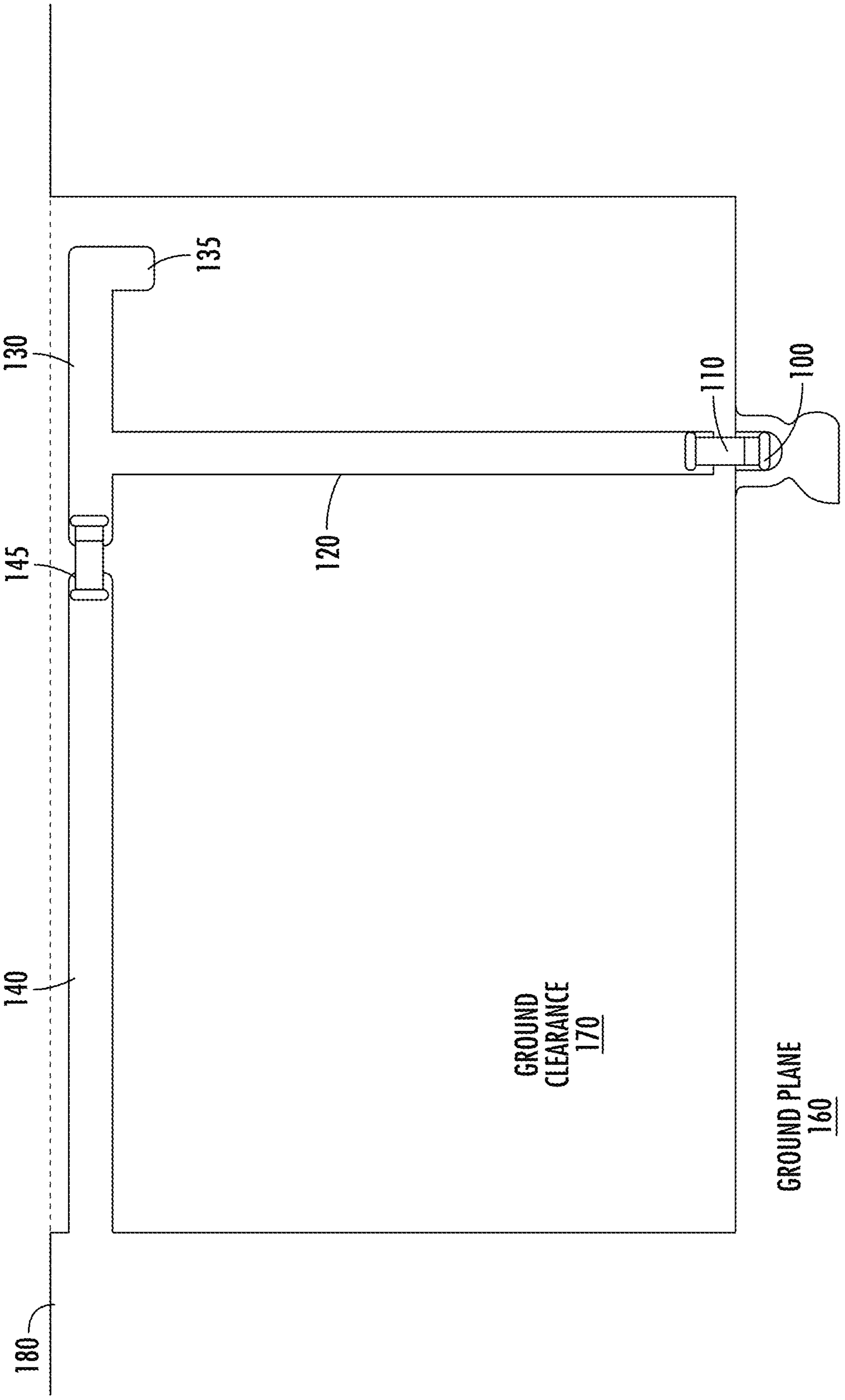
FIG. 3 shows the topology of the present dual band antenna according to one embodiment.

FIG. 3 shows the topology of an antenna structure that overcomes the issues of the prior art. The antenna structure incorporates features from both the loop ground edge radiating antenna and the inverted-F antenna. Consequently, it is able to operate at two different frequency ranges, thereby serving as a dual band antenna.

The antenna structure is disposed on the top layer of a printed circuit board 180. Much of the top layer may be a ground plane 160. The ground plane 160 comprises a conductive layer, such as copper, disposed on the top layer of the printed circuit board, which is electrically connected to ground. The ground clearance 170 is a region of the top layer, which is not electrically conductive. In certain embodiments, the metal that typically resides in this region is removed. The ground clearance 170 may be rectangular in shape. One of the sides of the rectangularly shaped ground clearance may be an edge of the printed circuit board 180. The dimensions of the ground clearance 170 may be selected based on the desired performance or resonance frequencies of the antenna structure. Note that the ground plane 160 extends to the edge of the printed circuit board 180 on both sides of the ground clearance 170.

An RF feed 100 is provided within the ground clearance 170. The RF feed 100 is electrically connected to the feeding trace 120, which is disposed in the ground clearance 170. The width of the feeding trace 120 may be any suitable width. In one embodiment, the width of the traces may be about 0.4 mm since this aligns with the solder footprint of the input capacitor 110.

Additionally, an input capacitor 110 is disposed between the feeding trace 120 and the RF feed 100. The RF feed 100 may connect to an impedance matching circuit, which, in turn, is in communication with the power amplifier of the radio circuitry.

The feeding trace 120 terminates in a T connection. This T connection may be less than 2 mm from the edge of the printed circuit board 180. Of course, other distances are also possible. For example, in some embodiments, the T connection may be less than 1 mm from the edge of the printed circuit board 180. In other embodiments, the T connection may be less than 0.5 mm, such as within about 0.4 mm from the edge of the printed circuit board 180. In one direction, which is perpendicular to the feeding trace 120, is the monopole branch 130. In the opposite direction, which is also perpendicular to the feeding trace 120, is the loop branch 140. The monopole branch 130 and the loop branch 140 may each be parallel to the edge of the printed circuit board 180 and may be within 2 mm from the edge. In some embodiments, the monopole branch 130 and the loop branch 140 may be less than 1 mm from the edge of the printed circuit board 180. In other embodiments, the monopole branch 130 and the loop branch 140 may be less than 0.5 mm, such as within about 0.4 mm from the edge of the printed circuit board 180.

The monopole branch 130 terminates in the ground clearance 170. In certain embodiments, the monopole branch 130 may include a small tuning trace 135, which may be perpendicular to the monopole branch 130 and parallel to the feeding trace 120. In other embodiments, the small tuning trace 135 may not be present.

The loop branch 140 extends in a linear fashion and connects to the ground plane 160. Note that, as noted above, the ground plane 160 extends to the edge of the printed circuit board. One or more capacitors 145 are disposed in series along the loop branch 140, such that current passing along the loop branch 140 must pass through the one or more capacitors 145. The one or more capacitors 145 may have the same value or different values. In certain embodiments, the capacitors may be used in pairs to lower the effect of component tolerance. For example, a single 0.3 pF capacitor may be replaced with two 0.6 pF capacitors in series.

The feeding trace 120, the monopole branch 130, the tuning trace 135 (if present), and the loop branch 140, like the rest of the ground plane 160, are a conductive material, such as copper.

Note that the feeding trace 120, the loop branch 140 and a portion of the ground plane 160 form a loop ground edge radiating antenna. This loop ground edge radiating antenna may be configured to operate at one of the two resonance frequencies. In certain embodiments, the loop ground edge radiating antenna operates at the lower of the two resonance frequencies. This resonance frequency may be between 2.40 GHz and 2.50 GHz. To achieve a resonance frequency around 2.45 GHz, the ground clearance 170 may be about 7 mm×10 mm, although other dimensions may be used for different frequency bands. Specifically, reducing the perimeter of the loop increases the resonance frequency of the loop ground edge radiating antenna. Conversely, increasing the perimeter of the loop decreases the resonance frequency of the loop ground edge radiating antenna.

The length of the monopole branch 130 and the optional tuning trace 135 may be modified to fine tune the second resonance frequency. This second resonance frequency may be between 5.0 GHZ and 6.0 GHz. Further, the distance between the monopole branch 130 and optional tuning trace 135 and the ground plane 160 may also be modified to fine tune the second resonance frequency. A longer monopole branch 130 results in a lower resonance frequency. Conversely, a shorter monopole branch 130 results in a higher resonance frequency. Additionally, disposing the monopole branch 130 closer to the ground plane 160 results in a lower resonance frequency, while increasing the distance between the monopole branch 130 and the ground plane 160 increases the resonance frequency.

The feeding trace 120, the monopole branch 130 and the optional tuning trace 135 serve as a monopole antenna having a second resonance frequency. In some embodiments, the second resonance frequency is greater than the first resonance frequency. Note that the loop branch 140 serves as the short circuit arm for the monopole antenna. In some embodiments, the total length of the monopole branch 130 and the optional tuning trace 135 may be about 6 mm, although other lengths may be used.

The input capacitor 110 is used to control the input impedance for both bands of the antenna structure. The one or more capacitors 145 are used to fine tune the input impedance for the resonance frequency of the loop edge radiating antenna.

Figure 4:
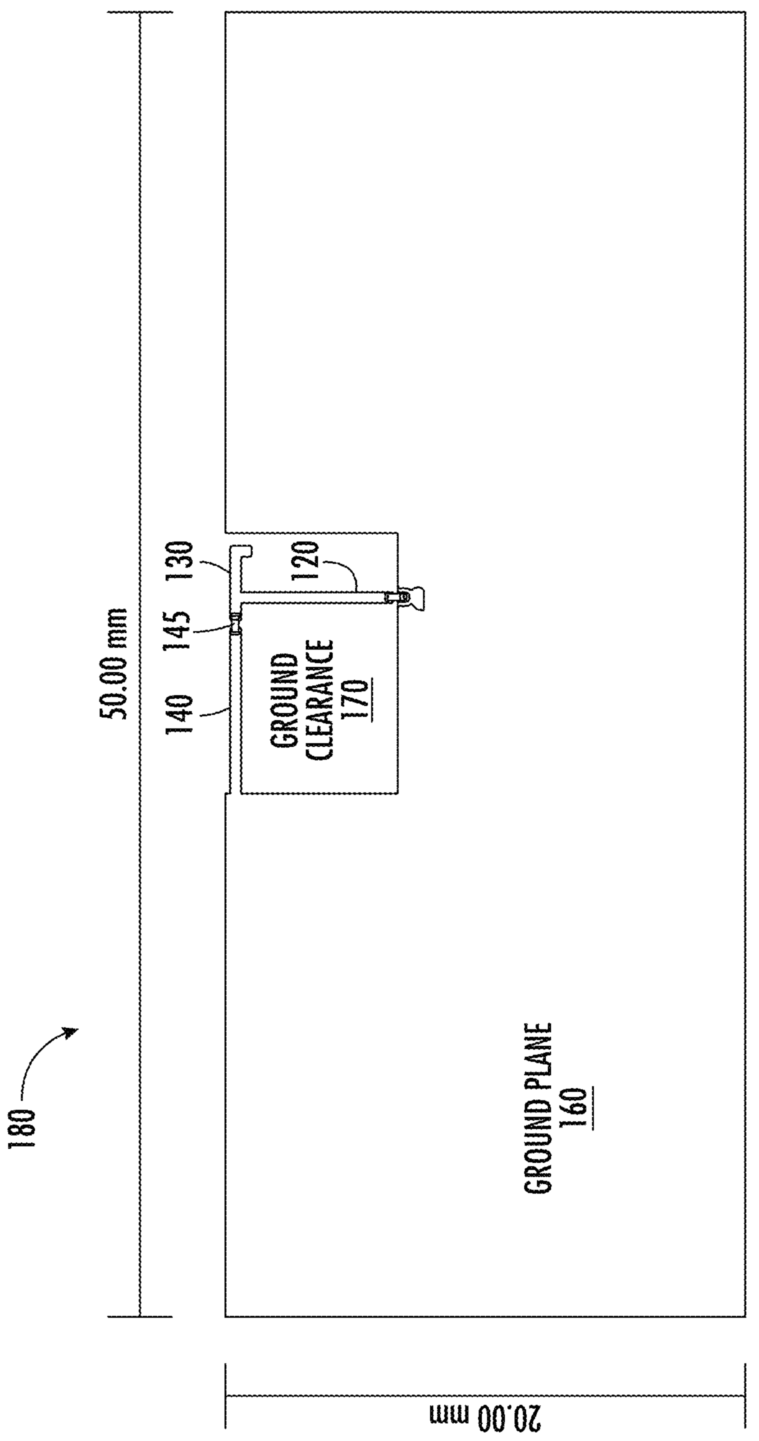
FIG. 4 shows the dual band antenna disposed on a printed circuit board.

FIG. 4 shows the antenna structure disposed on a printed circuit board 180. Note that the ground plane 160 extends to the edge of the printed circuit board 180 on both sides of the ground clearance 170. The ground clearance 170 may be roughly 10 mm by 7 mm, while the printed circuit board may be 50 mm by 20 mm. The loop branch 140 and the monopole branch 130 may be roughly 0.4 mm from the edge of the printed circuit board 180, although distances as small as 0.2 mm may be used.

Figure 5:
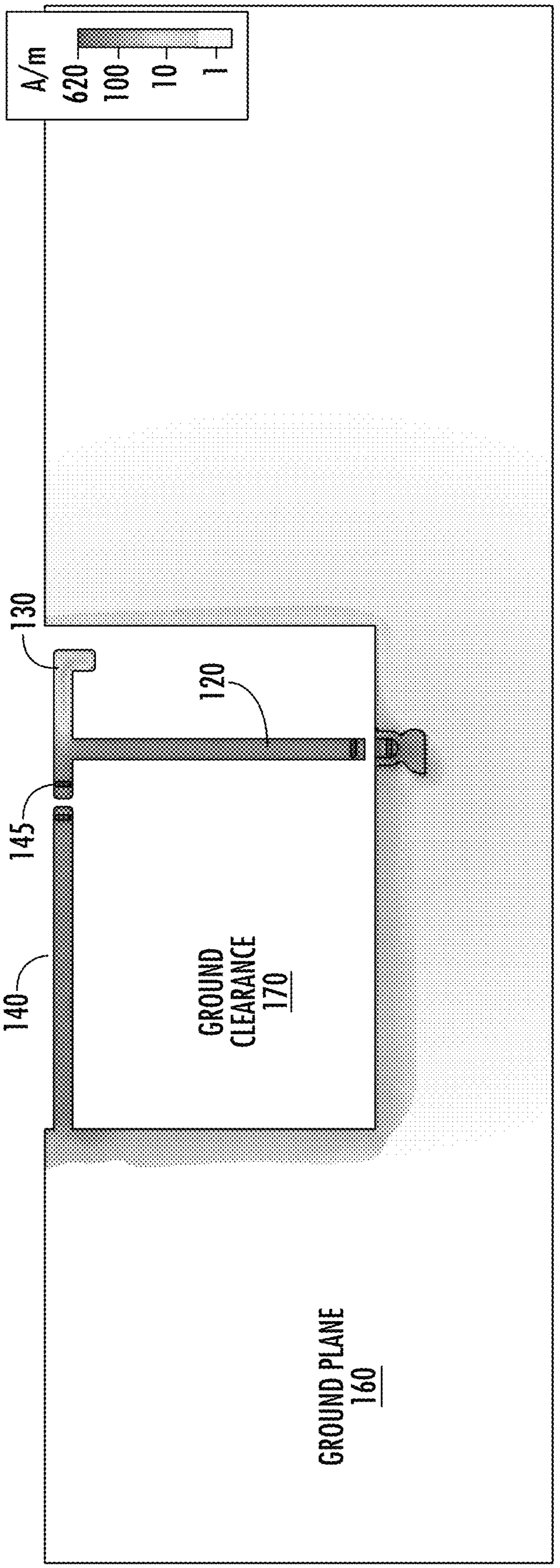
FIG. 5 shows the current distribution of the present dual band antenna when radiating at 2.45 GHZ.
Figure 6:
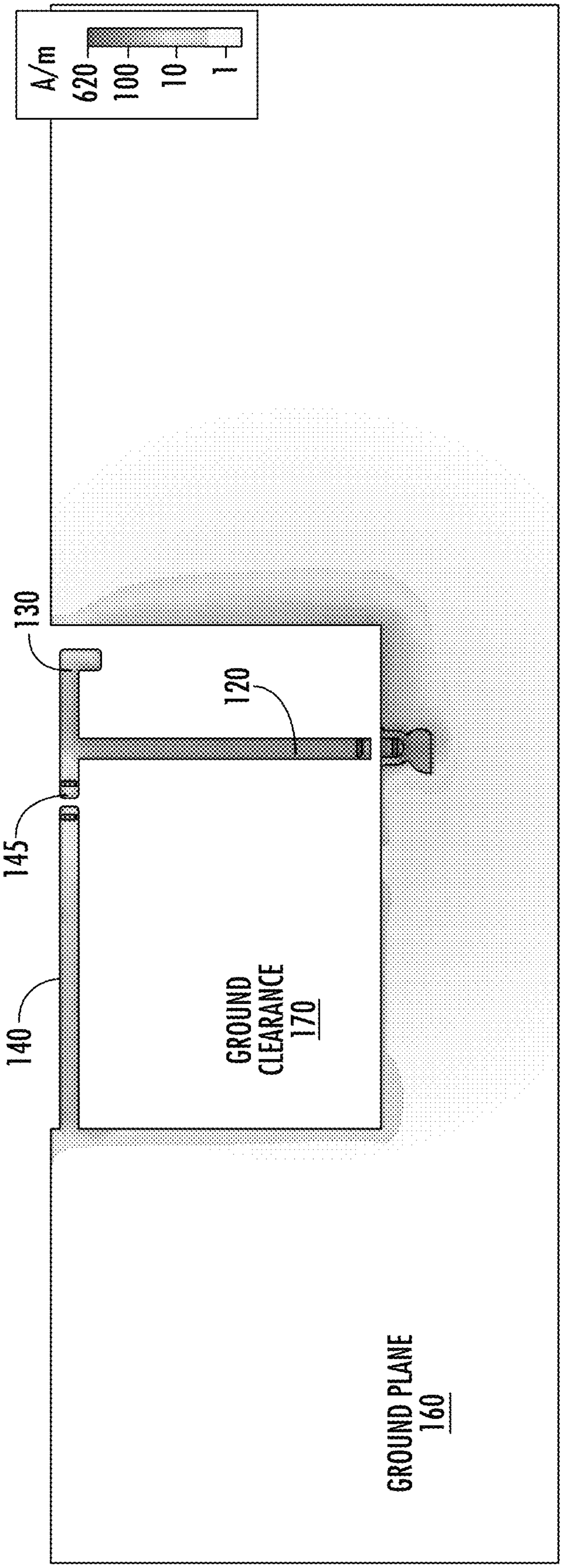
FIG. 6 shows the current distribution of the present dual band antenna when radiating at 5.5 GHZ.

FIGS. 5 and 6 show the distribution of current through the antenna structure at two different resonance frequencies. In this simulation, the loop edge radiating antenna was tuned to 2.45 GHZ, while the monopole antenna was tuned to 5.5 GHZ. FIG. 5 shows the current flowing through the antenna structure when the RF feed 100 provides a signal at 2.45 GHz. The current flows through the feeding trace 120 and the loop branch 140. The current also flows through the ground plane 160 adjacent to the ground clearance 170 from the loop branch 140 back toward the RF feed 100. An antenna radiator loop is created around the outside of the ground clearance 170. This antenna radiator loop allows the spread of loop-type current distributions on the ground plane 160 to be radiated outward. Note that almost no current passes through the monopole branch 130.

FIG. 6 shows the current flowing through the antenna structure when the RF feed 100 provides a signal at 5.5 GHZ. The current flows through the feeding trace 120 and the monopole branch 130. The current also flows through the ground plane 160 adjacent to the ground clearance 170 from the monopole branch 130 back toward the RF feed 100. Note that some short circuit current also flows through the loop branch 140.

As noted above, as seen in FIG. 5, almost no current flows through the monopole branch 130 when operating at the lower resonance frequency. Thus, in certain embodiments, the configuration of the loop ground edge radiating antenna is determined first. These parameters include the size of the ground clearance 170 (both length and width), as well as the selection of the values for the input capacitor 110 and the one or more capacitors 145. Once the loop ground edge radiating antenna has been finetuned, the monopole antenna may be configured. Parameters such as the length of the monopole branch 130, the presence or absence of a tuning trace 135, the distance between the monopole branch 130 and the ground clearance 170 may all be determined to establish the second resonance frequency.

Since almost no current flows through the monopole branch at the first resonance frequency, the tuning of the loop ground edge radiating antenna is minimally affected by any changes to the size and shape of the monopole branch 130.

While FIG. 3 shows the feeding trace 120 as being a straight segment, the disclosure is not limited to this embodiment. The feeding trace 120 may be straight, have any number of turns, or be curved.

The values for each of the input capacitor 110, and the one or more capacitors 145 may be determined via simulation or empirical testing. In certain embodiments, these values are all less than 10 pF.

Figure 7:
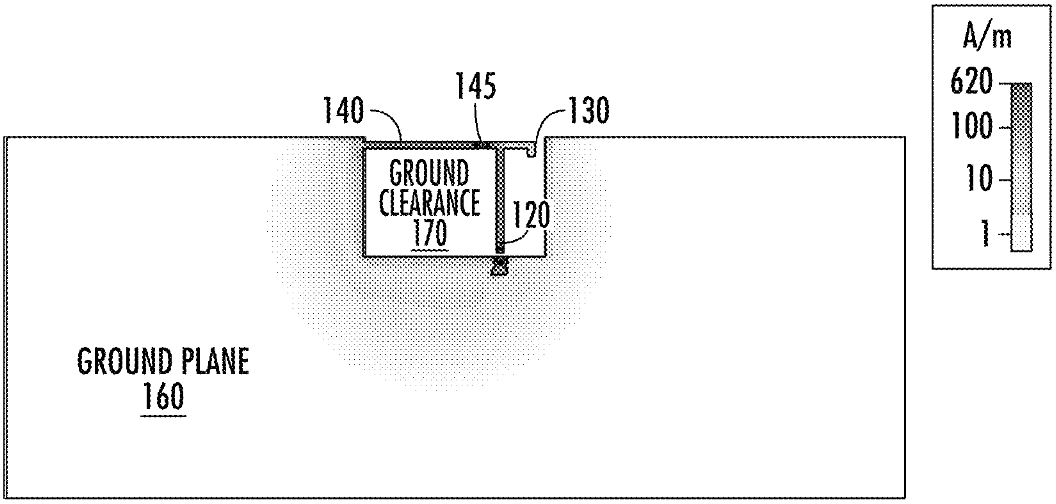
FIGS. 7-8 show the current distribution in the printed circuit board of FIG. 4 when operating at 2.45 GHZ and 5.5 GHZ, respectively.
Figure 8:
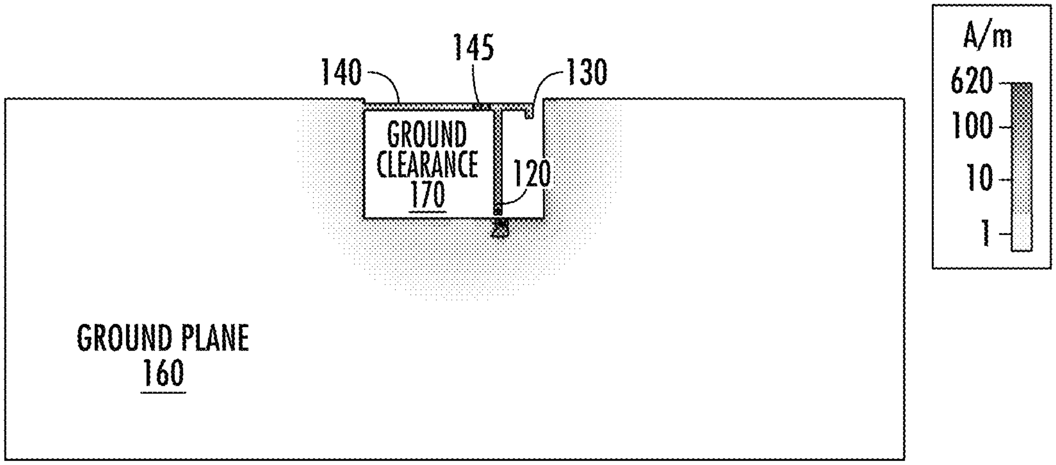

FIGS. 7-8 show current distribution in the printed circuit board when operating at 2.45 GHz and 5.5 GHZ, respectively. The RF current concentrates at the edge of the antenna traces (i.e. the feeding trace 120, the monopole branch 130 and the loop branch 140) and the edges of the loop. While the RF currents at the antenna trace and loop edges generate radiation, the fringing fields of the antenna side edge of the printed circuit board also radiate.

Figure 9:
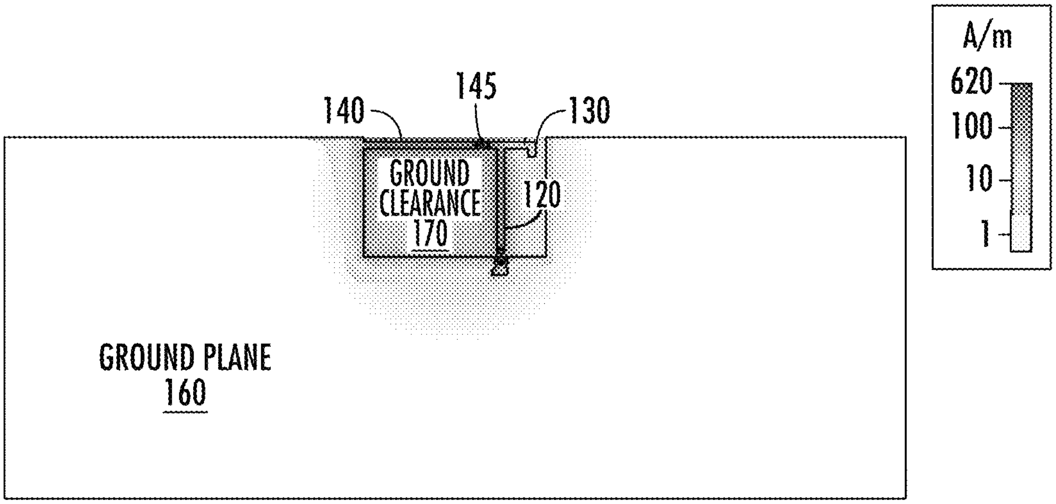
FIG. 9 shows the magnetic field (H-field) of the present dual band antenna when radiating at 2.45 GHZ.
Figure 10:
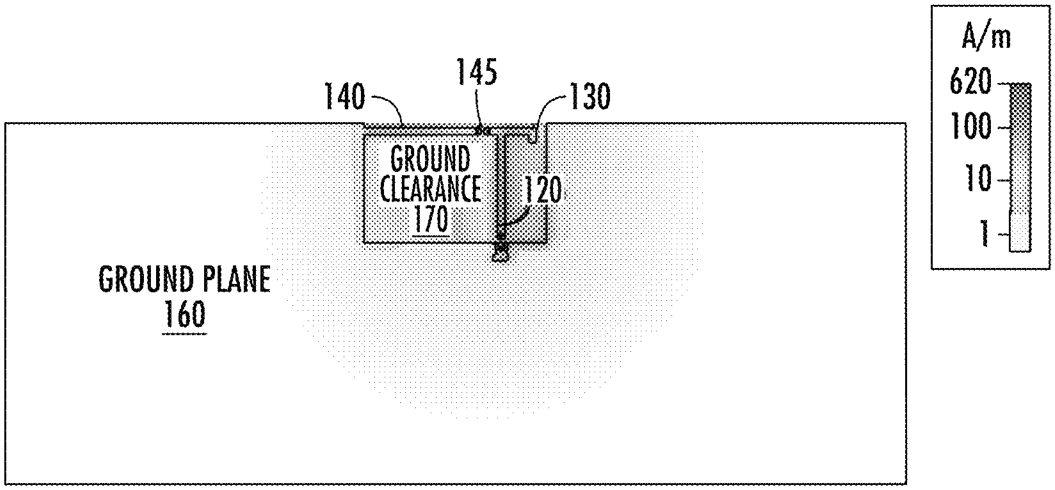
FIG. 10 shows the magnetic field (H-field) of the present dual band antenna when radiating at 5.5 GHZ.

FIGS. 9-10 show the magnetic fields (H fields) generated by the printed circuit board when operating at 2.45 GHZ and 5.5 GHZ, respectively. As can be seen, at the 2.45 GHz frequency band, the magnetic field is concentrating to the left hand side loop (formed by feeding trace 120, loop branch 140 and ground plane 160) as expected as that loop is tuned to the 2.45 GHz band operation and the loop currents are high there. While, at the 5.5 GHz frequency band, the magnetic field is concentrating on the right side area, where the magnetic field is mainly generated by the time varying electric field as a closed loop does not exist there.

Figure 11:
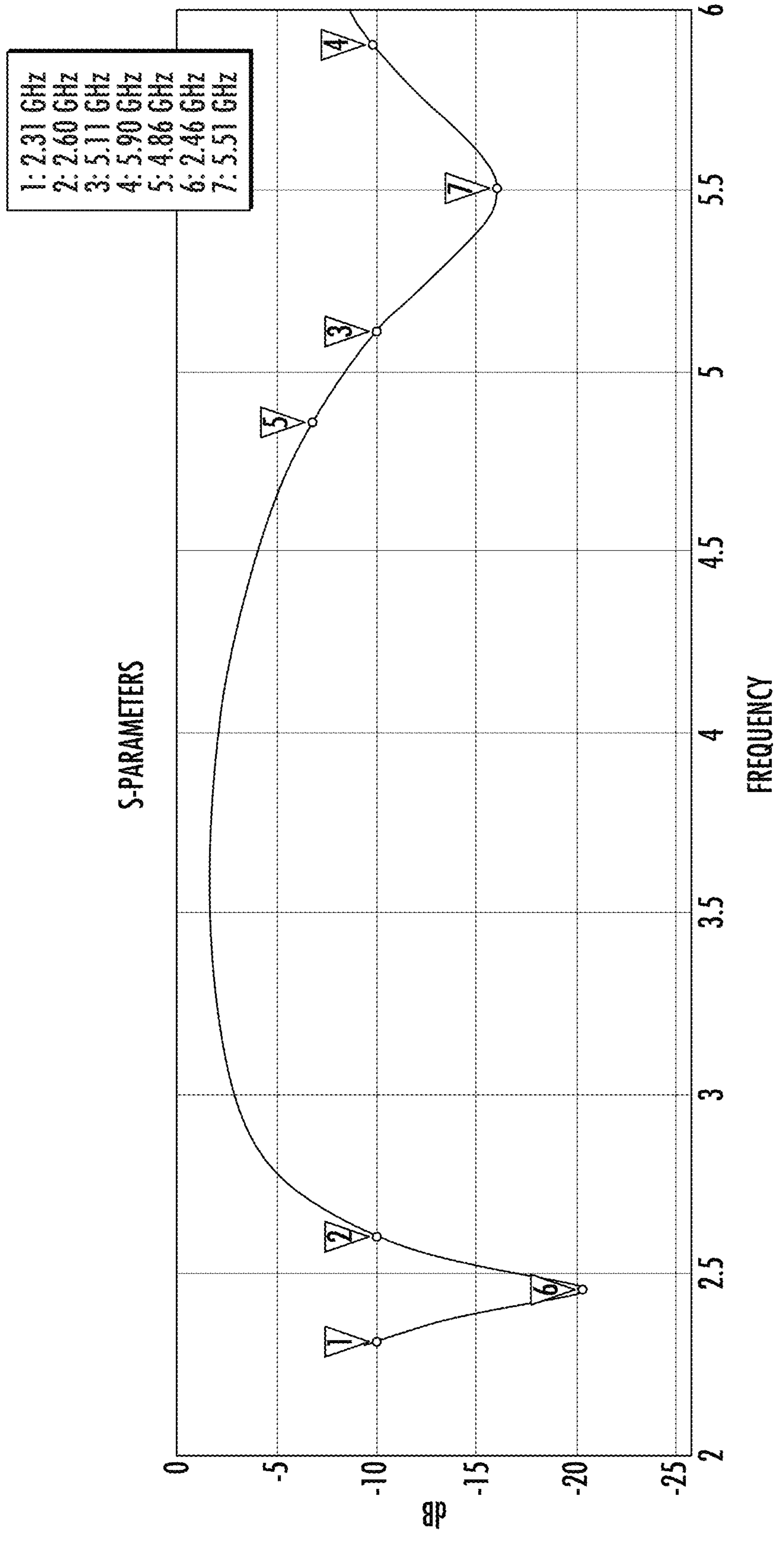
FIG. 11 shows the reflection coefficient of the present dual band antenna over a broad frequency range.

FIG. 11 shows the reflection coefficient (S11) of the antenna. For this graph, the ground plane was assumed to be 50 mm×20 mm. Note that the antenna has two resonant frequencies, which are clear in this graph. Because these frequencies are relatively far from one another, they create two bands where the reflection coefficient is less than −10 dB. The first band occurs between roughly 2.3 GHZ and 2.6 GHz, while the second band occurs between roughly 5.1 GHZ and 5.9 GHZ. In other words, the loop ground edge radiating antenna has a bandwidth of greater than 200 MHz, such as about 300 MHZ, while the monopole antenna has a bandwidth of greater than 700 MHz, such as roughly 800 MHZ.

Figure 12:
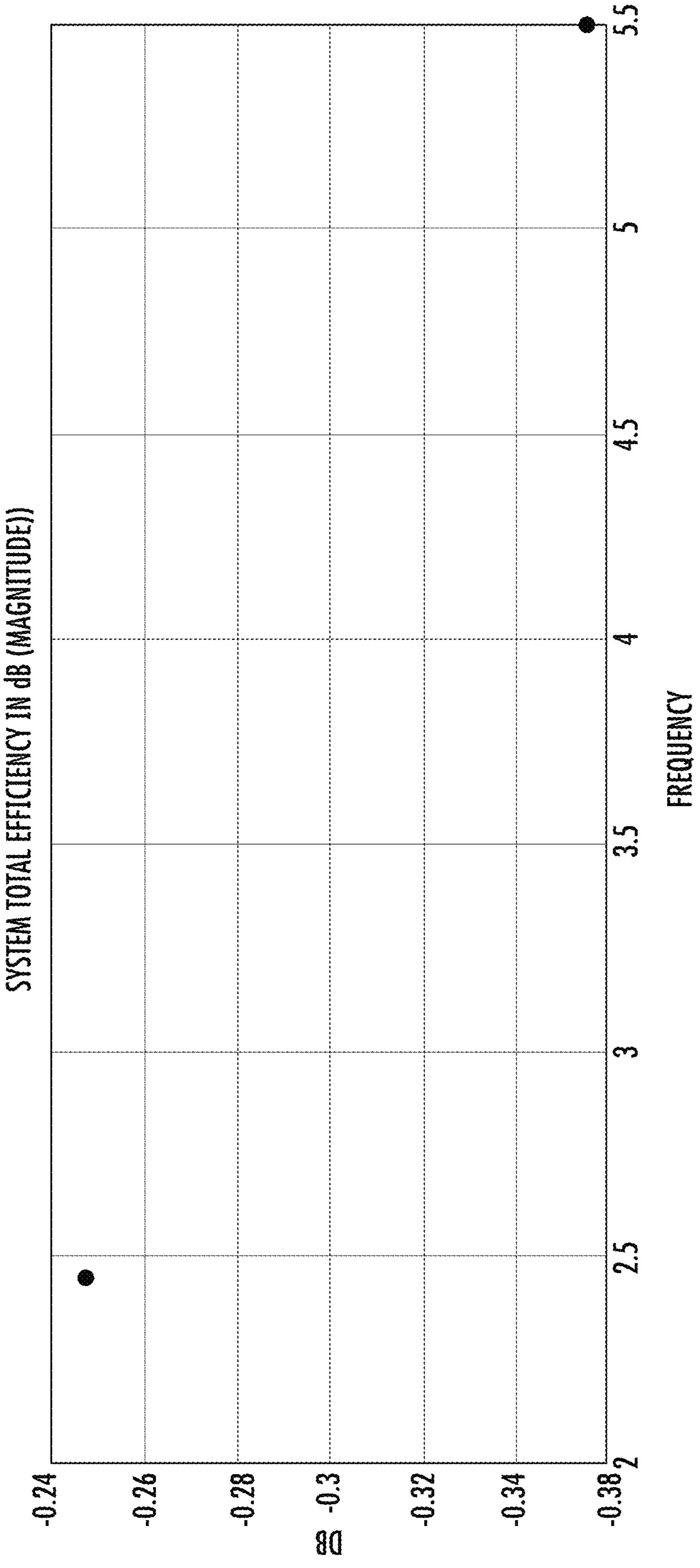
FIG. 12 shows the system efficiency of the present dual band antenna at two frequencies.

FIG. 12 shows the system total efficiency, as measured in dB. In this disclosure, total efficiency ($E_T$) is defined as radiation efficiency ($E_R$), multiplied by the impedance mismatch loss ($M_L$). Further, radiation efficiency is defined as the radiated power ($P_{RAD}$) divided by the input power ($P_{INPUT}$); in other words:

$$E_R = P_{RAD}/P_{INPUT}.$$

Note that the total efficiency is greater than −0.4 dB at 2.4 GHz and at 5.5 GHz.

Although the above disclosure describes the lower of the two resonance frequencies as being about 2.40 GHz to 2.50 GHz, it is understood that this lower resonance frequency may be changed to another value, such as 868 MHz or 915 MHz, by creating a larger loop. Additionally, the second resonance frequency may also be modified to another value, such as 2.4 GHz, by increasing the length of the monopole branch. In other words, the antenna structure described herein may be configured to have two resonance frequencies, where each may be tailored by varying different design parameters of the antenna.

This system and method have many advantages. Many network devices require the ability to operate at multiple frequencies. More specifically, network devices may have to support two different frequencies for WiFi. Additionally, these devices may also support Bluetooth and one or more IEEE 802.15.4 protocols. The present antenna structure provides two different resonance frequencies, that correspond to the frequencies used for WiFi. Additionally, this antenna structure provides this functionality in a very small footprint.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A dual band antenna, comprising:

a printed circuit board having a ground plane on a top layer, wherein the ground plane comprises a conductive material;

a ground clearance disposed on the top layer, wherein the ground clearance lacks a conductive material;

a loop ground edge radiating antenna having a feeding trace disposed in the ground clearance, and a loop branch, perpendicular to the feeding trace, that connects an end of the feeding trace to the ground plane, wherein one or more capacitors are located along a path of the loop branch, such that current passing along the loop branch passes through the one or more capacitors; and a monopole branch extending from the end of the feeding trace in an opposite direction from the loop branch, wherein the monopole branch terminates in the ground clearance.

2. The dual band antenna of claim 1, wherein the loop ground edge radiating antenna has a resonance frequency between 2.4 GHz and 2.5 GHZ.

3. The dual band antenna of claim 2, wherein a bandwidth of the loop ground edge radiating antenna is at least 200 MHZ.

4. The dual band antenna of claim 2, wherein the feeding trace, the monopole branch and the loop branch form a monopole antenna, and wherein the monopole antenna has a resonance frequency between 5.0 GHZ and 6.0 GHZ.

5. The dual band antenna of claim 4, wherein a bandwidth of the monopole antenna is at least 700 MHZ.

6. The dual band antenna of claim 1, wherein the ground clearance has dimensions that are equal to or less than 7 mm by 10 mm.

7. The dual band antenna of claim 1, wherein the feeding trace, the monopole branch and the loop branch form a monopole antenna, and wherein the monopole antenna includes a tuning branch disposed the end of the monopole branch.

8. The dual band antenna of claim 7, wherein the tuning branch is perpendicular to the monopole branch.

9. The dual band antenna of claim 1, wherein the ground clearance is rectangular in shape and one side of the rectangularly shaped ground clearance is an edge of the printed circuit board and the ground plane extends to the edge of the printed circuit board on both sides of the ground clearance.

10. A dual band antenna, comprising:

a printed circuit board having a ground plane on a top layer, wherein the ground plane comprises a conductive material;

a ground clearance disposed on the top layer, wherein the ground clearance is rectangular shaped and lacks a conductive material, wherein one side of the ground clearance is an edge of the printed circuit board and the ground plane extends to the edge of the printed circuit board on a second side and a third side of the ground clearance;

a feeding trace disposed in the ground clearance, a proximal end of the feeding trace in communication with an input capacitor and a RF feed;

a T connection disposed at a distal end of the feeding trace, wherein a loop branch extends perpendicular to the feeding trace in one direction and a monopole branch extends perpendicular to the feeding trace in an opposite direction; and wherein a distal end of the loop branch connects to a the ground plane on the second side of the ground clearance and a distal end of the monopole branch terminates in the ground clearance such that no conductive traces contact the third side of the ground clearance.

11. The dual band antenna of claim 10, wherein the T connection is located less than 2 mm from the edge of the printed circuit board.

12. The dual band antenna of claim 10, wherein the T connection is located less than 0.5 mm from the edge of the printed circuit board.

13. The dual band antenna of claim 10, wherein the monopole branch and the loop branch are each parallel to the edge of the printed circuit board.

14. The dual band antenna of claim 10, wherein the monopole branch includes a tuning trace, which is perpendicular to the monopole branch and parallel to the feeding trace.

15. The dual band antenna of claim 10, wherein one or more capacitors are disposed in series along the loop branch, such that current passing along the loop branch passes through the one or more capacitors.

16. The dual band antenna of claim 10, wherein the ground clearance has dimensions that are equal to or less than 7 mm by 10 mm.

* * * * *